US012617176B2

(12) United States Patent
Liu

(10) Patent No.: US 12,617,176 B2
(45) Date of Patent: May 5, 2026

(54) ELECTRONIC EXPRESS WAYBILL

(71) Applicant: Beijing Jingdong Zhenshi Information Technology Co., Ltd., Beijing (CN)

(72) Inventor: Xia Liu, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 296 days.

(21) Appl. No.: 18/272,277

(22) PCT Filed: Jan. 5, 2022

(86) PCT No.: PCT/CN2022/070251
§ 371 (c)(1),
(2) Date: Jul. 13, 2023

(87) PCT Pub. No.: WO2022/174687
PCT Pub. Date: Aug. 25, 2022

(65) Prior Publication Data
US 2024/0066831 A1     Feb. 29, 2024

(30) Foreign Application Priority Data

Feb. 22, 2021     (CN) ........................ 202110198943.X

(51) Int. Cl.
B32B 3/02          (2006.01)
B32B 3/24          (2006.01)
(Continued)

(52) U.S. Cl.
CPC ................ B32B 3/266 (2013.01); B32B 3/02 (2013.01); B32B 3/30 (2013.01); B32B 7/06 (2013.01);
(Continued)

(58) Field of Classification Search
None
See application file for complete search history.

(56) References Cited

U.S. PATENT DOCUMENTS 1,095,435  A  *  5/1914  Tate ........................ B42D 25/20
                                                          283/77
1,249,531  A  *  12/1917  Smith ................ B42D 15/0053
                                                          462/67
(Continued)

FOREIGN PATENT DOCUMENTS

BR        102019014456 A2  *  1/2021  ........... B65D 81/113
CN          103646607 A      3/2014
(Continued)

OTHER PUBLICATIONS

Machine Translation of JP2009025678A, Feb. 2009 (Year: 2009).*
(Continued)

*Primary Examiner* — Jeffrey A Vonch
(74) *Attorney, Agent, or Firm* — K&L Gates LLP

(57)          ABSTRACT

Provided is an electronic waybill, which relates to the technical field of logistics. The electronic waybill includes a base layer and a surface layer, where the surface layer is disposed on a side of the base layer, the base layer and the surface layer collectively constitute an information-bearing surface configured to bear waybill information, and after the surface layer is removed from the base layer, part of the waybill information is retained on the base layer and the other part of the waybill information is retained on the surface layer.

10 Claims, 5 Drawing Sheets

(51) Int. Cl.

| | | |
|---|---|---|
| *B32B 3/26* | (2006.01) |
| *B32B 3/30* | (2006.01) |
| *B32B 7/06* | (2019.01) |
| *B32B 7/12* | (2006.01) |
| *B32B 29/00* | (2006.01) |
| *B42D 15/00* | (2006.01) |
| *G09F 3/02* | (2006.01) |
| G09F 3/00 | (2006.01) |

(52) U.S. Cl.

CPC ............. *B32B 7/12* (2013.01); *B32B 29/005* (2013.01); *B42D 15/0053* (2013.01); *B42D 15/006* (2013.01); *B42D 15/0073* (2013.01); *B42D 15/0093* (2013.01); *G09F 3/02* (2013.01); *G09F 3/0288* (2013.01); *B32B 2250/03* (2013.01); *B32B 2250/26* (2013.01); *B32B 2307/75* (2013.01); *B32B 2429/00* (2013.01); *B32B 2519/00* (2013.01); *G09F 2003/022* (2013.01); *G09F 2003/023* (2013.01); *G09F 2003/0257* (2013.01); *G09F 2003/0267* (2013.01); *G09F 2003/0277* (2013.01); *G09F 3/0292* (2013.01); *Y10T 428/149* (2015.01); *Y10T 428/15* (2015.01); *Y10T 428/24298* (2015.01); *Y10T 428/24306* (2015.01); *Y10T 428/24331* (2015.01); *Y10T 428/24339* (2015.01); *Y10T 428/24777* (2015.01); *Y10T 428/28* (2015.01); *Y10T 428/2848* (2015.01)

(56) References Cited

U.S. PATENT DOCUMENTS

| | | | | |
|---|---|---|---|---|
| 3,974,311 A * | 8/1976 | Cherrin | ..................... | G09F 3/10 427/337 |
| 4,614,361 A * | 9/1986 | Foster | ....................... | B41L 1/22 283/79 |
| 5,267,898 A | 12/1993 | Doll et al. | | |
| 5,618,064 A * | 4/1997 | Main | ................... | B42D 15/006 283/79 |
| 5,893,587 A * | 4/1999 | Wong | ................... | G09F 3/0292 283/81 |
| 5,895,075 A * | 4/1999 | Edwards | ............... | G09F 3/0292 283/81 |
| 6,000,726 A * | 12/1999 | Campbell | ................. | G09F 3/10 283/105 |
| 6,021,942 A * | 2/2000 | Monico | ............... | B42D 15/006 283/79 |
| 6,244,629 B1 * | 6/2001 | Chess | .................. | B42D 15/006 283/79 |
| 7,475,912 B1 * | 1/2009 | Reffett | ................. | B42D 15/006 283/105 |
| 9,779,641 B1 * | 10/2017 | Esmail | ................... | B42D 25/20 |
| 10,163,372 B1 * | 12/2018 | Esmail | ................. | G09F 3/0292 |
| 2001/0033908 A1 * | 10/2001 | Ueki | ...................... | B42D 15/00 428/136 |
| 2005/0196573 A1 * | 9/2005 | Myers | .................. | G09F 3/0292 428/40.1 |
| 2006/0257608 A1 * | 11/2006 | Severn | ................. | G09F 3/0292 428/40.1 |
| 2007/0029787 A1 * | 2/2007 | Loftin, III | ............ | G09F 3/0288 283/74 |
| 2008/0102238 A1 * | 5/2008 | Swords | ................ | G09F 3/0292 428/40.1 |
| 2008/0191880 A1 | 8/2008 | Tuffe et al. | | |
| 2008/0286516 A1 * | 11/2008 | Lee | ....................... | G09F 3/0288 428/41.8 |
| 2009/0315317 A1 * | 12/2009 | Anderson | ............. | G09F 3/0288 283/81 |
| 2011/0155313 A1 | 6/2011 | Black | | |
| 2018/0130383 A1 * | 5/2018 | Esmail | ..................... | G09F 3/02 |
| 2024/0177633 A1 * | 5/2024 | Oguchi | .................. | B32B 3/266 |

FOREIGN PATENT DOCUMENTS

| | | | | |
|---|---|---|---|---|
| CN | 104123899 A * | 10/2014 | | |
| CN | 104369570 A * | 2/2015 | | |
| CN | 104956423 A | 9/2015 | | |
| CN | 205487114 U * | 8/2016 | | |
| CN | 105966111 A * | 9/2016 | ............ | B42D 25/20 |
| CN | 205582366 U * | 9/2016 | | |
| CN | 205788876 U | 12/2016 | | |
| CN | 206003443 U * | 3/2017 | | |
| CN | 106626873 A * | 5/2017 | ............ | B42D 25/20 |
| CN | 107116922 A | 9/2017 | | |
| CN | 107195242 A | 9/2017 | | |
| CN | 208970018 U * | 6/2019 | | |
| CN | 111326060 A * | 6/2020 | .............. | G09F 3/02 |
| CN | 210777537 U | 6/2020 | | |
| CN | 212010134 U * | 11/2020 | | |
| CN | 212171753 U | 12/2020 | | |
| CN | 112272845 A | 1/2021 | | |
| CN | 112757705 A | 5/2021 | | |
| CN | 216373576 U | 4/2022 | | |
| DE | 202004020031 U1 * | 3/2005 | .......... | B65D 81/113 |
| EP | 3023968 A1 * | 5/2016 | .......... | B32B 27/306 |
| FR | 2870620 A1 * | 11/2005 | ....... | G06K 19/06046 |
| GB | 2434139 A * | 7/2007 | .............. | G09F 3/03 |
| JP | H07232491 A | 9/1995 | | |
| JP | H10502745 A | 3/1998 | | |
| JP | 10166759 A * | 6/1998 | | |
| JP | 11070760 A * | 3/1999 | | |
| JP | 2000211269 A * | 8/2000 | | |
| JP | 2000263966 A * | 9/2000 | | |
| JP | 2001175175 A * | 6/2001 | | |
| JP | 2002002153 A * | 1/2002 | | |
| JP | 2003043925 A * | 2/2003 | | |
| JP | 2003063171 A * | 3/2003 | | |
| JP | 2003246382 A * | 9/2003 | | |
| JP | 2004117787 A * | 4/2004 | | |
| JP | 2004317875 A * | 11/2004 | | |
| JP | 2005059541 A * | 3/2005 | | |
| JP | 2007001274 A * | 1/2007 | | |
| JP | 2008030319 A | 2/2008 | | |
| JP | 2008181045 A * | 8/2008 | | |
| JP | 2008250005 A * | 10/2008 | | |
| JP | 2009025678 A * | 2/2009 | | |
| JP | 2010085635 A * | 4/2010 | | |
| JP | 2010228282 A * | 10/2010 | | |
| JP | 2011148207 A * | 8/2011 | | |
| JP | 2012024939 A * | 2/2012 | | |
| JP | 2013000965 A * | 1/2013 | | |
| JP | 2013049215 A * | 3/2013 | | |
| JP | 2013156519 A * | 8/2013 | | |
| JP | 2013195742 A * | 9/2013 | | |
| JP | 2014021358 A * | 2/2014 | | |
| JP | 2016090971 A | 5/2016 | | |
| JP | 2016109756 A * | 6/2016 | | |
| JP | 2016222807 A * | 12/2016 | | |
| JP | 2017071188 A * | 4/2017 | | |
| JP | 2019012194 A * | 1/2019 | | |
| JP | 2019025650 A * | 2/2019 | | |
| JP | 2019082730 A * | 5/2019 | | |
| JP | 2019177627 A | 10/2019 | | |
| JP | 2019181814 A * | 10/2019 | | |
| JP | 2020006590 A * | 1/2020 | | |
| JP | 2020023059 A * | 2/2020 | | |
| JP | 2020024249 A * | 2/2020 | | |
| JP | 2020024250 A * | 2/2020 | | |
| JP | 2020024251 A * | 2/2020 | | |
| JP | 2020024252 A * | 2/2020 | | |
| JP | 2020032538 A * | 3/2020 | | |
| JP | 2020040317 A * | 3/2020 | | |
| JP | 2020067541 A * | 4/2020 | | |
| KR | 101466302 B1 * | 11/2014 | .............. | G09F 3/02 |
| KR | 20170000221 U * | 1/2017 | .............. | G09F 3/03 |
| KR | 20170001602 U * | 5/2017 | .............. | G09F 3/10 |
| WO | WO-2010021062 A1 * | 2/2010 | .......... | G09F 3/0292 |
| WO | WO-2014199520 A1 * | 12/2014 | .......... | G09F 3/0297 |

(56)        References Cited

FOREIGN PATENT DOCUMENTS

WO        2017150386 A1      9/2017
WO        WO-2022210977 A1 * 10/2022    ............. B42D 11/00

OTHER PUBLICATIONS

Machine Translation of JP2010085635A, Apr. 2010 (Year: 2010).*
Machine Translation of JP2013156519A, Aug. 2013 (Year: 2013).*
Machine Translation of CN104369570A, Feb. 2015 (Year: 2015).*
Machine Translation of CN205582366U, Sep. 2016 (Year: 2016).*
Machine Translation of JP2016109756A, Jun. 2016 (Year: 2016).*
Supertech Papers, Glassine Release Paper, Feb. 2019 (Year: 2019).*
Machine Translation of JP2020024249A, Feb. 2020 (Year: 2020).*
PCT International Search Report and Written Opinion dated Mar. 28, 2022, for International Patent Application No. PCT/CN2022/070251.

Office Action from related Chinese Patent Application No. 202110198943.X dated Sep. 27, 2024.
Search Report from related Chinese Patent Application No. 202110198943.X dated Sep. 25, 2024.
First Office Action from related Japanese Patent Application No. 2023-533916 dated Apr. 30, 2024.
Search Report for corresponding Chinese Application No. 202110198943.X, dated Mar. 11, 2025.
Search Report for corresponding Chinese Application No. 202110198943.X, dated Mar. 11, 2025 (English Translation).
Office Action for corresponding Chinese Application No. 202110198943.X, dated Mar. 13, 2025.
Office Action for corresponding Chinese Application No. 202110198943.X, dated Mar. 13, 2025 (English Translation).
Search Report for corresponding Chinese Application No. 202110198943.X, dated Jun. 24, 2025.
Search Report for corresponding Chinese Application No. 202110198943.X, dated Jun. 24, 2025 (English Translation).

* cited by examiner

121

12114     1211     1212

12111

1221
1222
122

ELECTRONIC EXPRESS WAYBILL

CROSS-REFERENCE TO RELATED APPLICATIONS

This patent application is a National Stage Patent Application filed under 35 U.S.C. 371 based on International Patent Application No. PCT/CN2022/070251, filed on Jan. 5, 20233, which claims priority to Chinese Patent Application No. 202110198943.X filed with the China National Intellectual Property Administration (CNIPA) on Feb. 22, 2021, the disclosures of which are incorporated herein by reference in their entireties.

TECHNICAL FIELD

The present application relates to the technical field of logistics, for example, an electronic waybill.

BACKGROUND

At present, with the rapid development of electronic commerce and the logistics industry, more and more users purchase items through convenient express. However, the development of the express industry makes the privacy of the users become unsafe gradually. In particular, after receiving an item delivered by an express company, a user randomly discards the packaging of the item. As a result, a criminal collects information of the electronic waybill on the packaging such as a delivery address, a name, and a telephone number, which results in the leakage of the waybill information. The waybill information is used even by a person with malicious intent, which results in personal and property losses of the user.

The user needs to finish destroying the electronic waybill in the related art with a tool such as a pen or a knife. As a result, it is very inconvenient to destroy the waybill information.

Based on this, it is urgent to invent an electronic waybill so as to solve the problem that it is inconvenient to destroy the waybill information on the electronic waybill.

SUMMARY

The present application provides an electronic waybill with which waybill information can be destroyed simply and quickly.

The present application adopts the technical scheme described below.

An electronic waybill includes a base layer and a surface layer, where the surface layer is disposed on a side of the base layer, the base layer and the surface layer collectively constitute an information-bearing surface configured to bear waybill information, and after the surface layer is removed from the base layer, part of the waybill information is retained on the base layer and the other part of the waybill information is retained on the surface layer.

Figure 1:
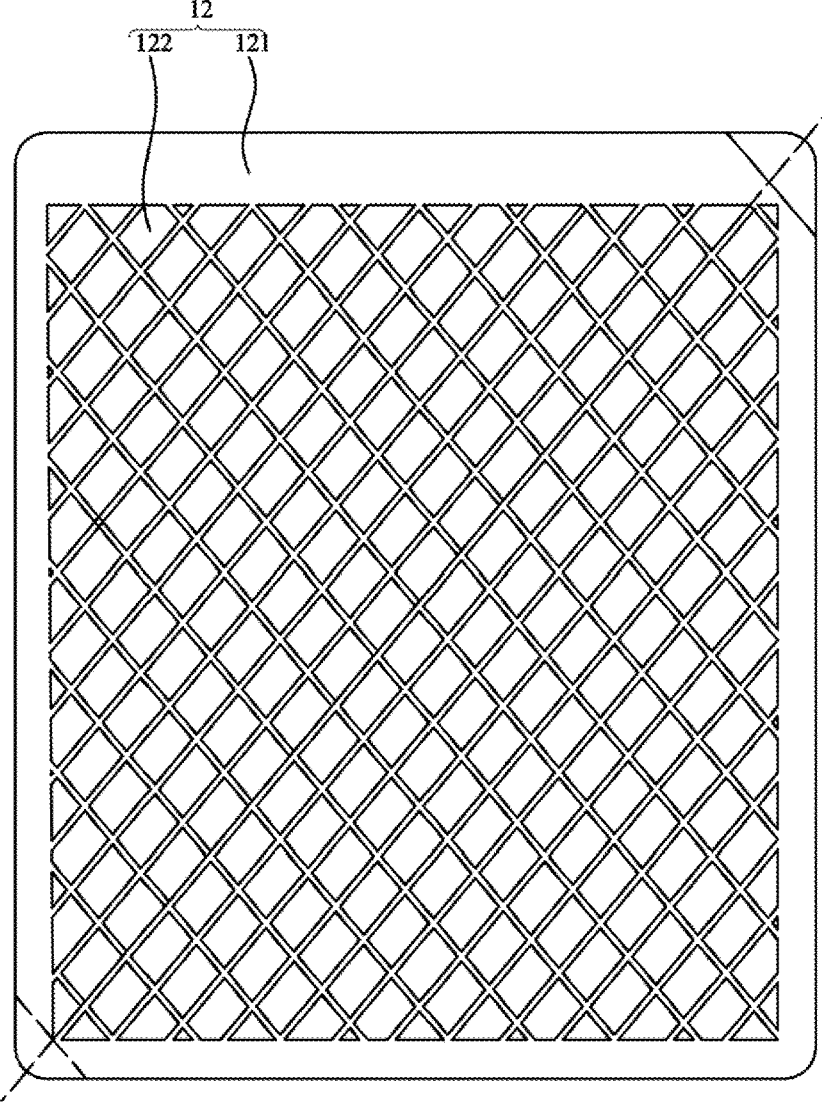
FIG. 1 is a structural diagram of a surface layer according to embodiment one.

Reference numbers in the drawings are listed as follows:

EMBODIMENT ONE

100 electronic waybill
11 base layer
111 intermediate layer
1111 second sticking portion
11111 first glassine paper layer
11112 third adhesive layer
1112 second lifting portion
112 bottom layer
1121 second glassine paper layer
1122 fourth adhesive layer
12 surface layer
121 surface layer body
1211 first sticking portion
12111 diagonal
12112 first printing layer
12113 first adhesive layer
12114 through hole
1212 first lifting portion
122 filling portion
1221 second printing layer
1222 second adhesive layer

EMBODIMENT TWO

200 electronic waybill
21 base layer
211 first glassine paper layer
212 third adhesive layer
22 surface layer
221 surface layer body
2211 through hole
2212 first printing layer
2213 first adhesive layer
222 filling portion
2221 second printing layer
2222 second adhesive layer

EMBODIMENT THREE

300 electronic waybill
31 base layer
311 third glassine paper layer
312 first adhesive layer
313 second adhesive layer
32 surface layer
321 surface layer body
3211 through hole 3212 first printing layer
3213 first glassine paper layer
322 filling portion
3221 second printing layer
3222 second glassine paper layer

EMBODIMENT FOUR 400 electronic waybill
41 base layer
411 first glassine paper layer
412 first adhesive layer
42 surface layer

EMBODIMENT FIVE 500 electronic waybill
51 base layer
511 second printing layer
512 second adhesive layer
52 surface layer
521 through hole
522 first printing layer
523 first adhesive layer

EMBODIMENT SIX 600 electronic waybill
61 base layer
611 connection layer
6111 sticking portion
6112 printing portion
612 second adhesive layer
62 surface layer
621 through hole
622 first printing layer
623 first adhesive layer

DETAILED DESCRIPTION

The present application is described in detail below in conjunction with the drawings and embodiments.

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or "interaction relations between two elements". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the embodiments, orientations or position relations indicated by terms such as "upper", "lower", "left", and "right" are based on the drawings. These orientations or position relations are intended only to facilitate the description and simplify an operation and not to indicate or imply that a device or an element referred to must have such particular orientations or must be configured or operated in such particular orientations. Thus, these orientations or position relations are not to be construed as limiting the present application. In addition, the terms "first" and "second" are used only to distinguish between descriptions and have no special meaning.

EMBODIMENT ONE

Figure 2:
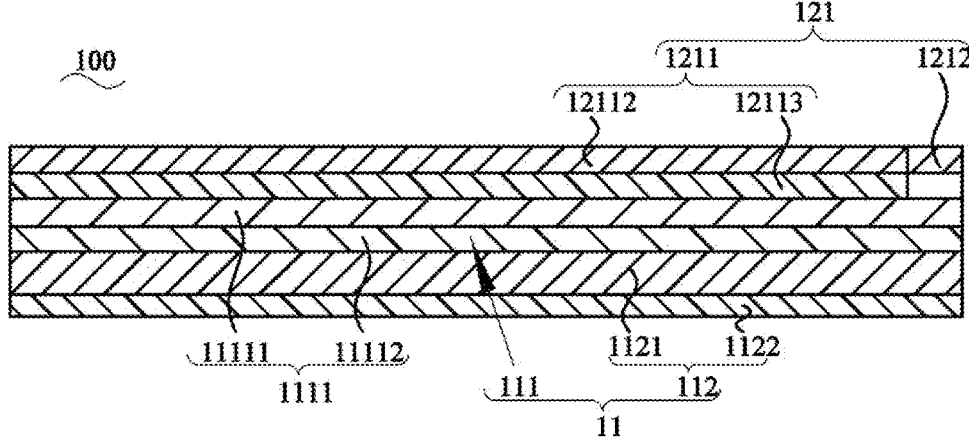
FIG. 2 is a cross-sectional view of an electronic waybill according to embodiment one in a direction.

As shown in FIGS. 1 and 2, this embodiment provides an electronic waybill 100 including a base layer 11 and a surface layer 12 which stick to each other. A side surface of the base layer 11 on which the surface layer 12 is not provided sticks to a product (for example, an express box) to be stuck so that the electronic waybill 100 can be prevented from falling off the express box, and a side surface of the surface layer 12 on which the base layer 11 is not provided is used for printing waybill information. After a user tears the surface layer 12 from the base layer 11, the user needs to finish completely destroying the waybill information with a tool such as a pen or a knife. As a result, it is very inconvenient for the user to destroy the waybill information.

Figures 3, 4:
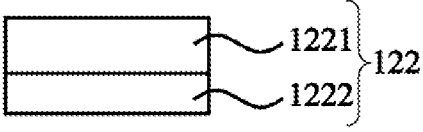
FIG. 3 is a structural diagram of a surface layer body according to embodiment one.
FIG. 4 is a structural diagram of a filling portion according to embodiment one.

To solve the preceding problem, as shown in FIGS. 1 and 3, the surface layer 12 is disposed on a side of the base layer 11, and the base layer 11 and the surface layer 12 collectively constitute an information-bearing surface configured to bear the waybill information. After the surface layer 12 is removed from the base layer 11, part of the waybill information is retained on the base layer 11, and the other part of the waybill information is retained on the surface layer 12. After the user removes the surface layer 12 from the base layer 11, the waybill information retained on the surface layer 12 and the waybill information retained on the base layer 11 are each incomplete so that the function of destroying the waybill information is achieved. Thus, the function of destroying the waybill information simply and quickly can be achieved.

For example, as shown in FIGS. 1 and 3, the surface layer 12 includes filling portions 122 and a surface layer body 121 which stick to the base layer 11, where the surface layer body 121 is provided with multiple through holes 12114 of the filling portions 122, the through holes 12114 are filled with the filling portions 122, the surface layer body 121 and the filling portions 122 stick to the base layer 11, and a surface of the surface layer 12 facing away from the base layer 11 constitutes the information-bearing surface. The part of the waybill information is printed on the surface layer body 121, and the other part of the waybill information is printed on the multiple filling portions 122. The user can tear the surface layer body 121 from the base layer 11 through a simple tearing action, and the waybill information retained on the surface layer body 121 and the waybill information retained on the filling portions 122 are each incomplete so that the function of better destroying the waybill information is achieved. Thus, the function of destroying the waybill information easily and quickly can be achieved.

As a scheme, the surface layer body 121 is connected to the filling portions 122 by tear lines.

As a scheme, as shown in FIG. 3, the multiple through holes 12114 are arranged in an array, and the cross-sectional area of a through hole 12114 is 1 mm² to 3 mm². Since the number of through holes 12114 is relatively large and the cross-sectional area of the through hole 12114 is relatively small, it can be ensured that the information retained on the filling portions 122 from which the surface layer body 121 is torn cannot be identified so that the function of better destroying the waybill information can be achieved.

As shown in FIG. 2, the base layer 11 includes an intermediate layer 111 and a bottom layer 112, where one side surface of the intermediate layer 111 sticks to the bottom layer 112, and the surface layer body 121 and the filling portions 122 stick to the other side surface of the intermediate layer 111. The user tears the intermediate layer 111 from the bottom layer 112 so that it can be ensured that complete waybill information is removed from the express box and the user conveniently archives the surface layer 12 and the intermediate layer 111 which stick to each other and on which the complete waybill information is retained. The user tears the surface layer body 121 from the intermediate layer 111 so that the waybill information can be destroyed and the function of destroying the waybill information simply and quickly can be achieved. The electronic waybill 100 provided by this embodiment is applied so that a customer can choose, according to different requirements of the customer, to tear the surface layer body 121 from the intermediate layer 111 or tear the surface layer 12 and the intermediate layer 111 which stick together from the bottom layer 112 so that different objects to destroy the waybill information or archive the waybill information are achieved and the different requirements of the customer are met.

If the surface layer body 121 completely sticks to the intermediate layer 111, an operator cannot easily separate the surface layer body 121 from the intermediate layer 111 with a fingernail, which results in difficulty in removing the surface layer body 121 from the intermediate layer 111. To solve the preceding problem, as shown in FIG. 3, the surface layer body 121 includes a first sticking portion 1211 and a first lifting portion 1212, where the first sticking portion 1211 is provided with the through holes 12114, the first sticking portion 1211 and the intermediate layer 111 stick to each other, and the first lifting portion 1212 is connected at a corner position of the first sticking portion 1211 and configured to be separate from the intermediate layer 111. The user inserts a finger into the gap between the first lifting portion 1212 and the intermediate layer 111, clamps the first lifting portion 1212 with two fingers, and applies a force to the surface layer body 121 so that the effect of removing the surface layer body 121 from the intermediate layer 111 quickly can be achieved. In addition, if the surface layer body 121 completely sticks to the intermediate layer 111, the user will tear the periphery of the surface layer body 121 in the process in which the surface layer body 121 and the intermediate layer 111 which completely stick to each other are separated initially, resulting in that the periphery of the surface layer body 121 has an incomplete and unaesthetic shape. However, the first lifting portion 1212 is configured to be separate from the intermediate layer 111 so that it is not much laborious for the user to initially separate the surface layer body 121 from the intermediate layer 111 and the user does not tear the periphery of the surface layer body 121. Thus, it can be ensured that the periphery of the surface layer body 121 has a complete and aesthetic shape.

For example, as shown in FIG. 3, the first sticking portion 1211 includes a first printing layer 12112 and a first adhesive layer 12113 which stick to each other, and the first printing layer 12112 is connected to the first lifting portion 1212. As shown in FIG. 4, a filling portion 122 includes a second printing layer 1221 and a second adhesive layer 1222 which stick to each other, and the first adhesive layer 12113 and the second adhesive layer 1222 stick to the intermediate layer 111 separately. For example, the first printing layer 12112 and the second printing layer 1221 may be thermal paper, writing paper, or coated paper so that the waybill information can be quickly printed and better clarity of the waybill information can be ensured. For example, the first adhesive layer 12113 and the second adhesive layer 1222 may be double-sided tapes, self-adhesive stickers, or adhesives so that the effect of better sticking the surface layer body 121 to the intermediate layer 111 can be achieved and the first adhesive layer 12113 and the second adhesive layer 1222 can prevent the surface layer body 121 from falling off the intermediate layer 111 during the transportation of the express box.

Figure 5:
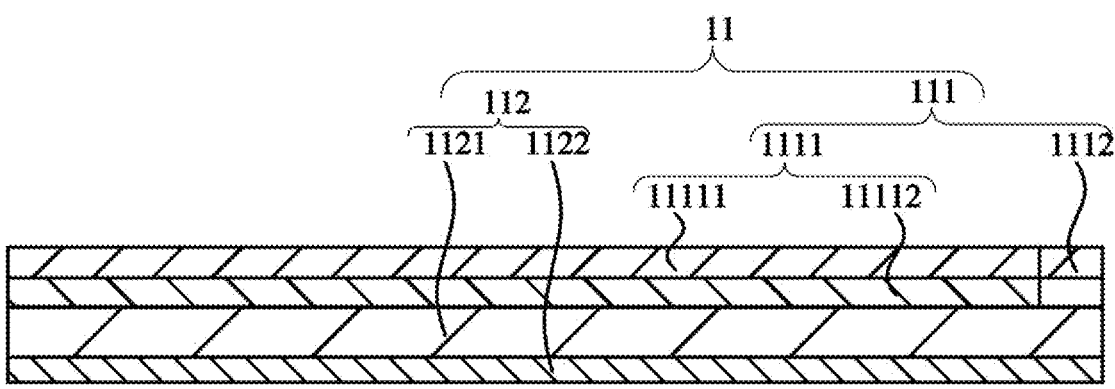
FIG. 5 is a cross-sectional view of a base layer according to embodiment one in another direction.

If the intermediate layer 111 completely sticks to the bottom layer 112, the operator cannot easily separate the intermediate layer 111 from the bottom layer 112 with the fingernail, which results in difficulty in removing the intermediate layer 111 from the bottom layer 112. To solve the preceding problem, as shown in FIG. 5, the intermediate layer 111 includes a second sticking portion 1111 and a second lifting portion 1112, where a side surface of the second sticking portion 1111 facing away from the first sticking portion 1211 sticks to the bottom layer 112, and the second lifting portion 1112 is connected at a corner position of the second sticking portion 1111 and configured to be separate from the bottom layer 112. The user inserts a finger into the gap between the second lifting portion 1112 and the bottom layer 112, clamps the second lifting portion 1112 with two fingers, and applies a force to the surface layer body 121 and the intermediate layer 111 which stick together so that the effect of removing the surface layer body 121 and the intermediate layer 111 which stick together from the bottom layer 112 quickly can be achieved. In addition, if the intermediate layer 111 completely sticks to the bottom layer 112, the user will tear the periphery of the intermediate layer 111 or the periphery of the bottom layer 112 in the process in which the user initially separates the intermediate layer 111 and the bottom layer 112 which completely stick together, resulting in that the peripheries of the surface layer body 121 and the intermediate layer 111 which stick together and are removed have incomplete and unaesthetic shapes. In this embodiment, the second lifting portion 1112 is configured to be separate from the bottom layer 112 so that it is not much laborious for the user to initially separate the intermediate layer 111 from the bottom layer 112 and the user does not tear the periphery of the surface layer body 121 and the periphery of the intermediate layer 111. Thus, it can be ensured that the peripheries of the surface layer body 121 and the intermediate layer 111 which are removed have complete and aesthetic shapes.

For example, as shown in FIG. 5, the second sticking portion 1111 includes a first glassine paper layer 11111 and a third adhesive layer 11112, the second lifting portion 1112 is connected to the first glassine paper layer 11111, and one side of the first glassine paper layer 11111 sticks to the first adhesive layer 12113 and the second adhesive layer 1222. Since the first glassine paper layer 11111 has a smooth surface, the first adhesive layer 12113 and the second adhesive layer 1222 are conveniently removed from the surface of the first glassine paper layer 11111, the surface layer body 121 is conveniently removed from the second sticking portion 1111, and remaining adhesive can be prevented from sticking to the surface of the first glassine paper layer 11111 so that the intermediate layer 111 from which the surface layer body 121 is removed has a smooth and aesthetic surface. The other side of the first glassine paper layer 11111 sticks to the third adhesive layer 11112, and a side of the third adhesive layer 11112 facing away from the first glassine paper layer 11111 sticks to the bottom layer 112. The third adhesive layer 11112 is provided so that the effect of better sticking the intermediate layer 111 to the bottom layer 112 can be achieved and the third adhesive layer 11112 can prevent the intermediate layer 111 from falling off the bottom layer 112 during the transportation of the express box.

For example, as shown in FIG. 5, the bottom layer 112 includes a second glassine paper layer 1121 and a fourth adhesive layer 1122, and the third adhesive layer 11112 sticks to the second glassine paper layer 1121. Since the second glassine paper layer 1121 has a smooth surface, the third adhesive layer 11112 is conveniently removed from the bottom layer 112, and the adhesive of the third adhesive layer 11112 can be prevented from remaining on the second glassine paper layer 1121 so that the second glassine paper layer 1121 has an aesthetic outer surface. A fourth adhesive layer 1122 sticks to a surface of the second glassine paper layer 1121 facing away from the third adhesive layer 11112, and a surface of the fourth adhesive layer 1122 facing away from the second glassine paper layer 1121 sticks to the express box so that the effect of better sticking the bottom layer 112 to the express box is achieved and the electronic waybill 100 can be prevented from falling off the express box during the transportation of the express box. For example, the third adhesive layer 11112 and the fourth adhesive layer 1122 may be the double-sided tapes, the self-adhesive stickers, or the adhesives.

Figure 6:
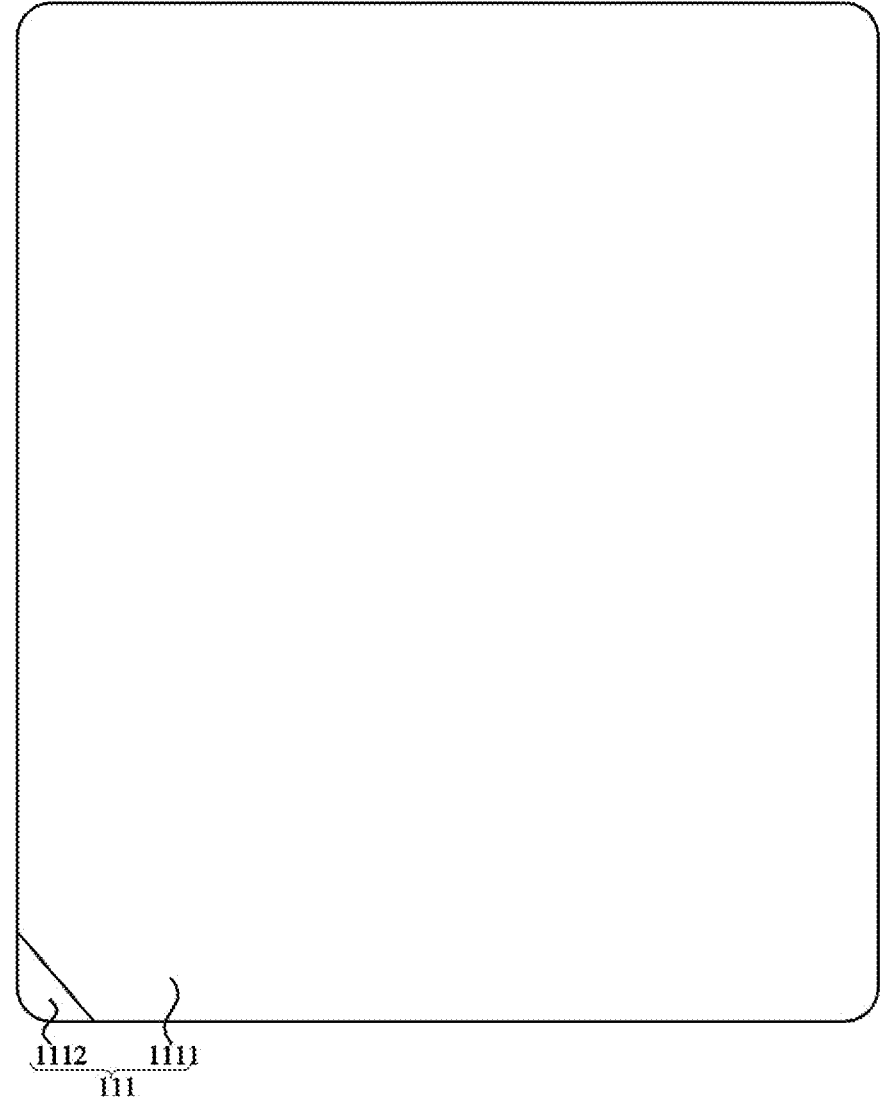
FIG. 6 is a structural diagram of an intermediate layer according to embodiment one.

As shown in FIGS. 1, 3, and 6, the electronic waybill 100 is rectangular, and the first lifting portion 1212 and the second lifting portion 1112 are arranged along the diagonal 12111 of the electronic waybill 100. Since the first lifting portion 1212 and the second lifting portion 1112 are relatively far away from each other, the user can be prevented from incorrectly tearing off the layer to be torn off.

As a scheme, corresponding marks can be provided at positions on the upper surface of the surface layer 12 corresponding to the first lifting portion 1212 and the second lifting portion 1112 separately so that it is convenient to remind the user to lift the corresponding layer. For example, "to destroy information" is marked at a position on the upper surface of the surface layer 12 corresponding to the first lifting portion 1212, and "to retain information" is marked at a position on the upper surface of the surface layer 12 corresponding to the second lifting portion 1112.

As a scheme, as shown in FIG. 3, the user tears the surface layer 12 or the intermediate layer 111 along the diagonal 12111, the through holes 12114 are configured to be parallelograms, and two sides of the parallelogram are parallel to the diagonal 12111 so that it is convenient to separate the filling portions 122 from the surface layer body 121. Thus, the function of better destroying the waybill information can be achieved.

As a scheme, as shown in FIG. 3, the free end of the first lifting portion 1212 and/or the free end of the second lifting portion 1112 are configured to have round corners so that the user is prevented from being cut when pinching the first lifting portion 1212 or the second lifting portion 1112 by hand, thereby improving user experience.

EMBODIMENT TWO

Figure 7:
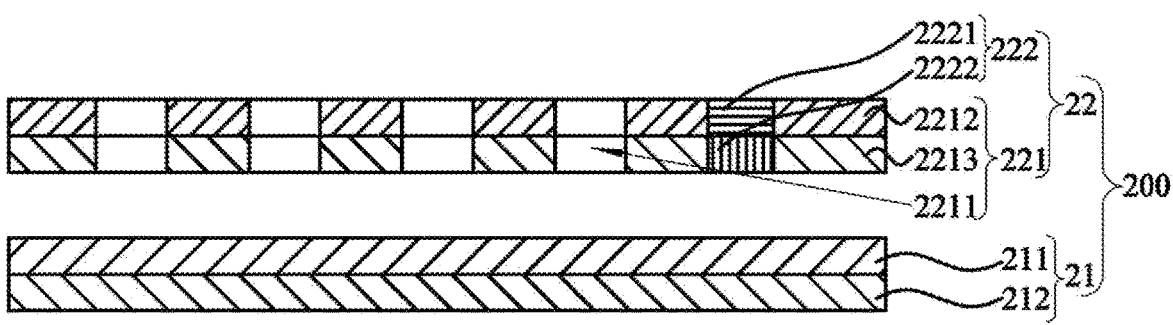
FIG. 7 is a cross-sectional view of an electronic waybill according to embodiment two.

As shown in FIG. 7, an electronic waybill 200 includes a base layer 21 and a surface layer 22, where the surface layer 22 includes a surface layer body 221 and filling portions 222, and the surface layer body 221 is provided with through holes 2211 filled with the filling portions 222. After a user removes the surface layer body 221 from the base layer 21, the filling portions are retained on the base layer 21 so that the function of destroying waybill information is achieved. Thus, the function of destroying the waybill information simply and quickly can be achieved.

The main difference between the structure of the electronic waybill 200 provided by this embodiment and the structure of the electronic waybill 100 provided by embodiment one is described below. As shown in FIG. 7, the surface layer body 221 includes a first printing layer As shown in FIG. 7, the surface layer body 221 includes a first printing layer 2212 and a first adhesive layer 2213 which stick to each other, the through holes 2211 extend through the first printing layer 2212 and the first adhesive layer 2213, a filling portion 222 includes a second printing layer 2221 and a second adhesive layer 2222 which stick to each other, the base layer 21 includes a stuck first glassine paper layer 211, a side of the first adhesive layer 2213 facing away from the first printing layer 2212 sticks to the first glassine paper 211, and a side of the second adhesive layer 2222 facing away from the second printing layer 2221 sticks to the first glassine paper layer 211. The electronic waybill 200 in this embodiment has fewer layers and a simpler structure than the electronic waybill 100 in embodiment one and is convenient to manufacture.

As a scheme, as shown in FIG. 7, the base layer 21 further includes a third adhesive layer 212 disposed on a side of the first glassine paper layer 211 facing away from the surface layer 22 so that the electronic waybill 200 can be stuck to a product (for example, an express box) to be stuck.

EMBODIMENT THREE

Figure 8:
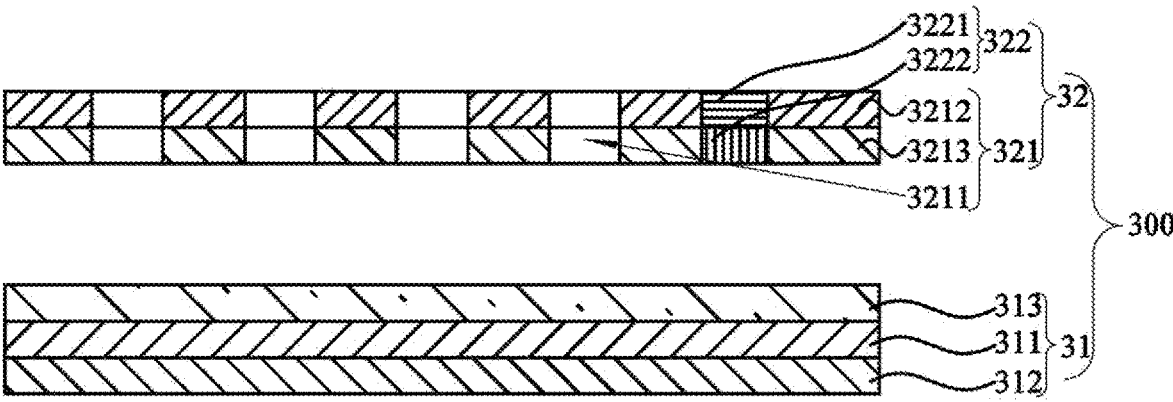
FIG. 8 is a cross-sectional view of an electronic waybill according to embodiment three.

The structure of an electronic waybill 300 provided by this embodiment is substantially the same as that of the electronic waybill 100 provided by embodiment one. As shown in FIG. 8, the electronic waybill 300 includes a base layer 31 and a surface layer 32, the surface layer 32 includes a surface layer body 321 and filling portions 322, and the surface layer body 321 is provided with through holes 3211 filled with the filling portions 322. After the user removes the surface layer body 321 from the base layer 31, the filling portions 322 are retained on the base layer 31 so that the function of destroying waybill information is achieved. Thus, the function of destroying the waybill information simply and quickly can be achieved.

The main difference between the structure of the electronic waybill 300 provided by this embodiment and the structure of the electronic waybill 100 provided by embodiment one is described below. As shown in FIG. 8, the surface layer body 321 includes a first printing layer 3212 and a first glassine paper layer 3213 which stick to each other, and the through holes 3211 extend through the first printing layer 3212 and the first glassine paper layer 3213, and a filling portion 322 includes a second printing layer 3221 and a second glassine paper layer 3222 which stick to each other, the base layer 31 includes a third glassine paper layer 311 and a second adhesive layer 313 which stick to each other, and the first glassine paper layer 3213 and the second glassine paper layer 3222 stick to a side of the second adhesive layer 313 facing away from the third glassine paper layer 311 separately. The electronic waybill 300 in this embodiment has fewer layers and a simpler structure than the electronic waybill 100 in embodiment one and is convenient to manufacture.

Figure 9:
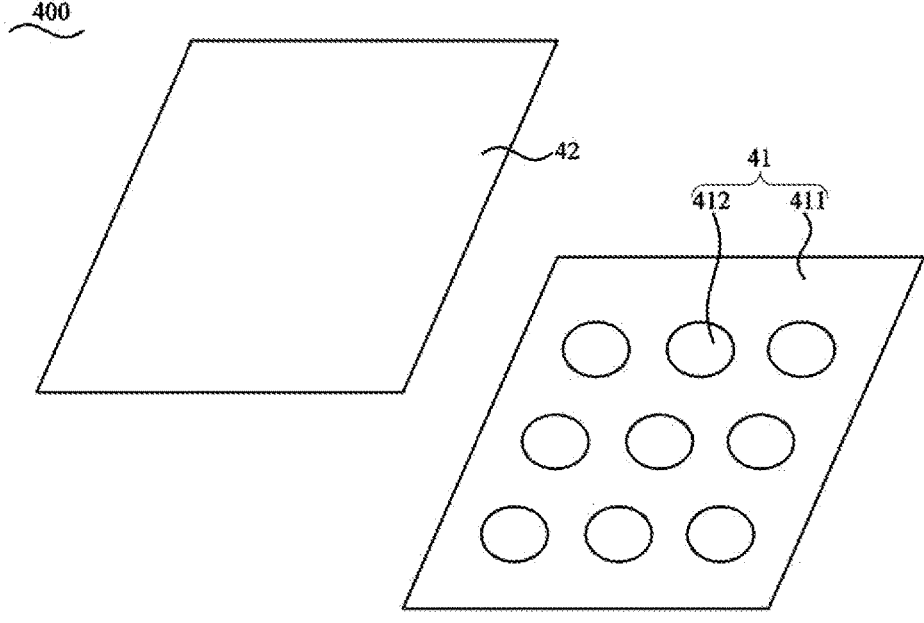
FIG. 9 is an exploded view of an electronic waybill according to embodiment four.

As a scheme, as shown in FIG. 8, the base layer 31 further includes a first adhesive layer 312, the first adhesive layer 312 sticks to a side of the third glassine paper layer 311 facing away from the second adhesive layer 313, and the first adhesive layer 312 can implement the function of sticking the electronic waybill 300 to a product (for example, an express box) to be stuck. CL EMBODIMENT FOUR The main difference between the structure of an electronic waybill 400 provided by this embodiment and the structure of the electronic waybill 100 provided by embodiment one is described below. As shown in FIG. 9, the electronic waybill 400 includes a base layer 41 and a surface layer 42, where the base layer 41 includes a first glassine paper layer 411 and multiple first adhesive layers 412 arranged on a side of the first glassine paper layer 411, the surface layer 42 sticks to the first adhesive layers 412, and a surface of the surface layer 42 facing away from the first adhesive layers 412 constitutes an information-bearing surface.

After a user removes the surface layer 42 from the base layer 41, part of the surface layer 42 sticking to the first adhesive layers 412 is retained on the base layer 41 so that the function of destroying the waybill information is achieved. Thus, the function of destroying the waybill information simply and quickly can be achieved. The electronic waybill 400 in this embodiment has fewer layers and a simpler structure than the electronic waybill 100 in embodiment one and is convenient to manufacture.

To ensure that the surface layer 42 sticks to the base layer 41 in a relatively firm manner and is prevented from falling off the base layer 41 during the transportation of an express box, the multiple first adhesive layers 412 are arranged in an array as shown in FIG. 9.

EMBODIMENT FIVE

Figure 10:
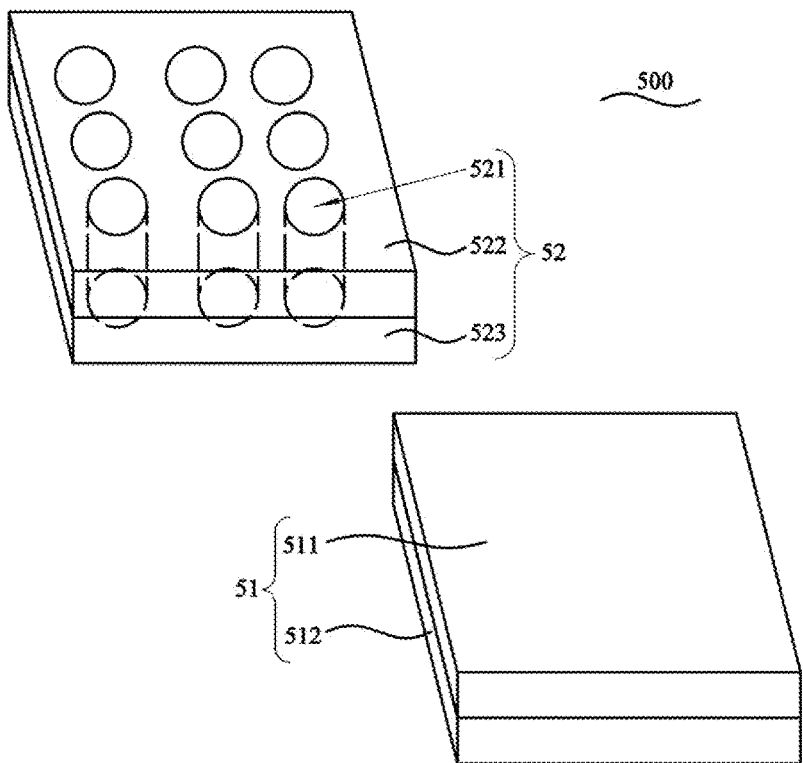
FIG. 10 is an exploded view of an electronic waybill according to embodiment five.

The main difference between the structure of an electronic waybill 500 provided by this embodiment and the structure of the electronic waybill 100 provided by embodiment one is described below. As shown in FIG. 10, a surface layer 52 is provided with multiple through holes 521, the surface layer 52 sticks to a base layer 51, and a surface of the surface layer 52 facing away from the base layer 51 and a surface of the base layer 51 exposed by the through holes 521 collectively constitute an information-bearing surface. After the user removes the surface layer 52 from the base layer 51, part of the waybill information is retained on the surface layer 52, and part of the waybill information is retained on the base layer 51 so that the function of destroying the waybill information is achieved. Thus, the function of destroying the waybill information simply and quickly can be achieved.

The electronic waybill 500 in this embodiment has fewer layers and a simpler structure than the electronic waybill 100 in embodiment one and is convenient to manufacture.

For example, as shown in FIG. 10, the surface layer 52 includes a first printing layer 522 and a first adhesive layer 523 which stick to each other, the through holes 521 extend through the first printing layer 522 and the first adhesive layer 523, the base layer 51 includes a second printing layer 511, and the first adhesive layer 523 sticks to a side of the second printing layer 511. In addition, to implement that the electronic waybill 500 sticks to an express box, the base layer 51 further includes a second adhesive layer 512 sticking to a side of the second printing layer 511 facing away from the first adhesive layer 523, and the second adhesive layer 512 sticks to the express box to prevent the electronic waybill 500 from falling off the express box during the transportation of the express box.

EMBODIMENT SIX

Figure 11:
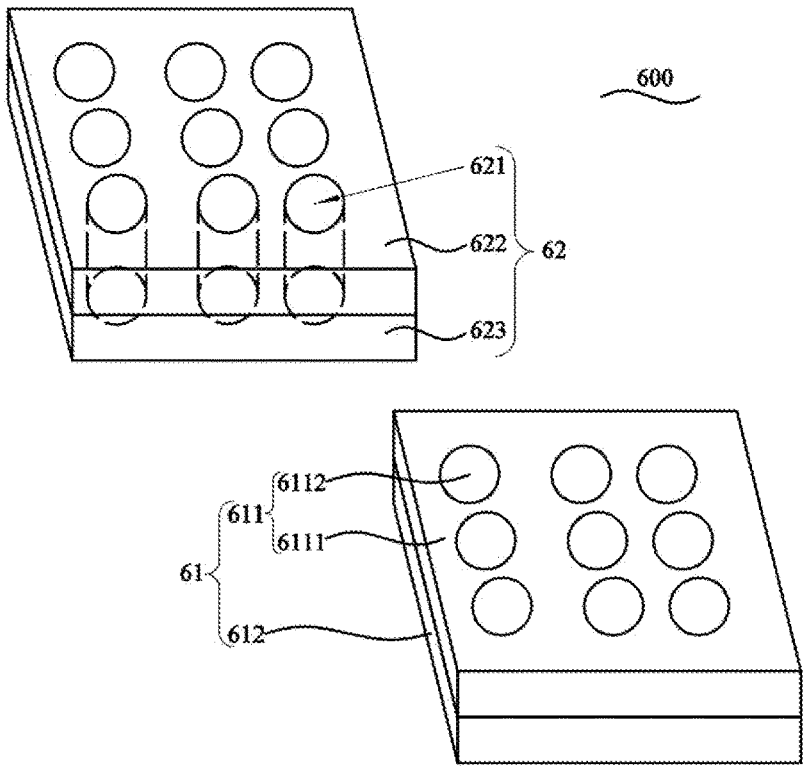
FIG. 11 is an exploded view of an electronic waybill according to embodiment six.

The main difference between the structure of an electronic waybill 600 provided by this embodiment and the structure of the electronic waybill 500 provided by embodiment five is described below. As shown in FIG. 11, a base layer 61 includes a connection layer 611, the connection layer 611 includes a sticking portion 6111 and multiple printing portions 6112, and each of the printing portions 6112 has the same shape and size as a respective through hole of through holes 621 and is configured to face the respective through hole 621. The sticking portion 6111 is made of glassine paper, and the printing portions 6112 are made of printer paper. When the first adhesive layer 623 sticks to the sticking portion 6111, the printing portions 6112 and the first printing layer 622 collectively constitute an information-bearing surface. After a user removes the surface layer 62 from the base layer 61, part of the waybill information is retained on the first printing layer 622, and part of the waybill information is retained on the printing portions 6112 so that the function of destroying the waybill information is achieved. Thus, the function of destroying the waybill information simply and quickly can be achieved.

In addition, to implement that the electronic waybill 600 sticks to an express box, the base layer 61 further includes a second adhesive layer 612 sticking to a side of the connection layer 611 facing away from the first adhesive layer 623, and the second adhesive layer 612 sticks to the express box to prevent the electronic waybill 600 from falling off the express box during the transportation of the express box.

What is claimed is:

1. An electronic waybill, comprising:
   a base layer and a surface layer, wherein the surface layer is disposed on a side of the base layer;
   wherein the surface layer comprises filling portions and a surface layer body which stick to the base layer, wherein the surface layer body is provided with a plurality of through holes filled with the filling portions, and a surface of the surface layer facing away from the base layer constitutes the information-bearing surface, the filling portions are printed with a first part of waybill information, the surface layer body is printed with a second part of waybill information and the first part of the waybill information and the second part of the waybill information constitute complete waybill information;
   wherein the base layer comprises a bottom layer, when the electronic waybill is to be used, the surface layer is removed from the base layer, the first part of the waybill information and the second part of the waybill information are separated from each other, such that the complete waybill information is destroyed; and
   wherein the base layer further comprises an intermediate layer, a side surface of the intermediate layer sticks to a side of the bottom layer, the surface layer body and the filling portions stick to the other side surface of the intermediate layer, the other side surface of the bottom layer on which the intermediate layer is not provided sticks to a product, and when the electronic waybill is to be used, the surface layer and the intermediate layer are removed collectively from the bottom layer, such that the complete waybill information is retained.

2. The electronic waybill according to claim 1, wherein the surface layer body comprises a first sticking portion and a first lifting portion, wherein the first sticking portion is provided with the plurality of through holes, the first sticking portion and the intermediate layer stick to each other, and the first lifting portion is connected at a corner position of the first sticking portion and configured to be separate from the intermediate layer.

3. The electronic waybill according to claim 2, wherein the intermediate layer comprises a second sticking portion and a second lifting portion, wherein a side surface of the second sticking portion facing away from the first sticking portion sticks to the bottom layer, and the second lifting portion is connected at a corner position of the second sticking portion and configured to be separate from the bottom layer.

4. The electronic waybill according to claim 3, wherein the electronic waybill is rectangular, and the first lifting portion and the second lifting portion are arranged along a diagonal of the electronic waybill.

5. The electronic waybill according to claim 4, wherein a through hole of the plurality of through holes is a parallelogram, and two sides of the parallelogram are parallel to the diagonal of the electronic waybill.

6. The electronic waybill according to claim 1, wherein the surface layer body is connected to the filling portions by tear lines.

7. The electronic waybill according to claim 6, wherein the surface layer body comprises a first sticking portion and a first lifting portion, wherein the first sticking portion is provided with the plurality of through holes, the first sticking portion and the intermediate layer stick to each other, and the first lifting portion is connected at a corner position of the first sticking portion and configured to be separate from the intermediate layer.

8. The electronic waybill according to claim 7, wherein the intermediate layer comprises a second sticking portion and a second lifting portion, wherein a side surface of the second sticking portion facing away from the first sticking portion sticks to the bottom layer, and the second lifting portion is connected at a corner position of the second sticking portion and configured to be separate from the bottom layer.

9. The electronic waybill according to claim 8, wherein the electronic waybill is rectangular, and the first lifting portion and the second lifting portion are arranged along a diagonal of the electronic waybill.

10. The electronic waybill according to claim 9, wherein a through hole of the plurality of through holes is a parallelogram, and two sides of the parallelogram are parallel to the diagonal of the electronic waybill.

* * * * *